Figure 1:
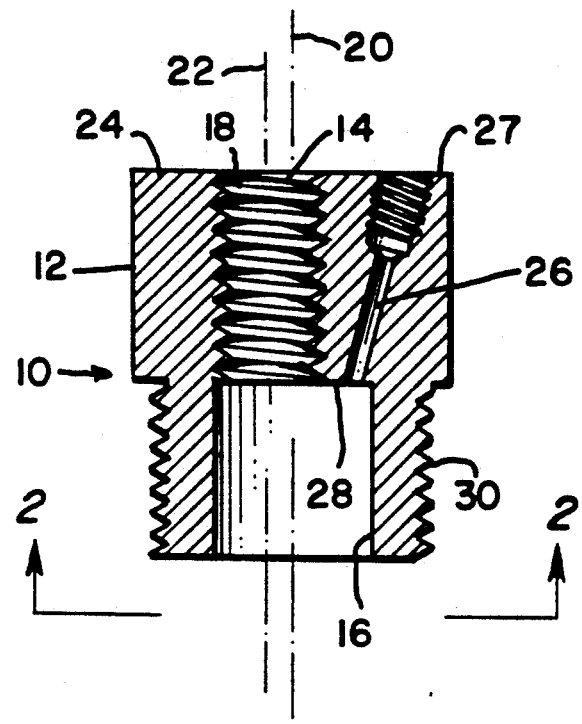

United States Patent [19]

Dupler

[11] Patent Number: 5,241,930
[45] Date of Patent: Sep. 7, 1993

[54] SPARK PLUG ADAPTER

[75] Inventor: W. Theodore Dupler, Corning, N.Y.

[73] Assignee: Dresser-Rand Company, Corning, N.Y.

[21] Appl. No.: 13,606

[22] Filed: Feb. 4, 1993

[51] Int. Cl.$^5$ ............................................... F02B 19/10
[52] U.S. Cl. ............................. 123/169 PA; 123/267
[58] Field of Search .................. 123/169 PA, 266, 267

[56] References Cited

U.S. PATENT DOCUMENTS

| | | | |
|---|---|---|---|
| 3,406,667 | 10/1968 | Evans et al. | 123/267 |
| 3,661,125 | 5/1972 | Stumpfig | 123/267 |
| 4,182,281 | 1/1980 | Heintzelman | 123/169 PA |
| 4,242,990 | 1/1981 | Scherenberg et al. | 123/169 PA |
| 4,248,189 | 2/1981 | Barber et al. | 123/169 PA |
| 4,338,897 | 7/1982 | Drumheller et al. | 123/267 |
| 4,542,724 | 9/1985 | Blais | 123/169 PA |
| 4,864,989 | 9/1989 | Markley | 123/267 |
| 5,085,189 | 2/1992 | Huang et al. | 123/267 |

FOREIGN PATENT DOCUMENTS 2304779 10/1976 France .................. 123/267

*Primary Examiner*—E. Rollins Cross
*Assistant Examiner*—Weilun Lo
*Attorney, Agent, or Firm*—Bernard J. Murphy

[57] ABSTRACT

A body, having a throughgoing bore formed therein has an intermediate land. A first portion of the bore is threaded to receive a spark plug therein, and an outer portion of the body is threaded to accommodate its insertion into a cylinder head. A channel, opening externally of the body, and onto said land, is provided for admitting fuel therethrough to a body-held spark plug.

4 Claims, 1 Drawing Sheet

SPARK PLUG ADAPTER

This invention pertains to spark plug-ignition engines, and in particular to an adapter for a spark plug for use in such engines.

It is desirable to operate engines with lean air/fuel mixtures, but if the mixture is too lean, the mixture-igniting spark plug may be unable to cause ignition. To meet the problem, it would be beneficial to be able to charge the engine cylinder with the lean mixture but, in some way, provide a rich mixture to the spark plug for an ignition which will insure a concomitant ignition of the cylinder-received lean mixture.

It is an object of this invention to satisfy the aforesaid purpose, by setting forth an adapter for the spark plug which can supply fuel therethrough directly to the spark plug.

Particularly, then, it is an object of this invention to disclose a spark plug adapter comprising a body having a throughgoing bore formed therein; wherein a first portion of said bore is unthreaded, and a remaining portion of said bore is threaded; and said body has a central, longitudinal axis; wherein one of said bore portions has a central, longitudinal axis which is parallel to, and offset from said axis of said body; and means formed in said body, independent of said bore, for accommodating fluid flow therethrough from an axial end of said body to one of said bore portions.

It is also an object of this invention to set forth a spark plug adapter comprising a centrally-bored body having (a) a circumferential wall of a given length, and (b) means formed therein for threadedly receiving a spark plug therein; and means formed through, and substantially parallel with, said wall, for admitting fluid into said body at a location which is intermediate said given length.

Figure 2:
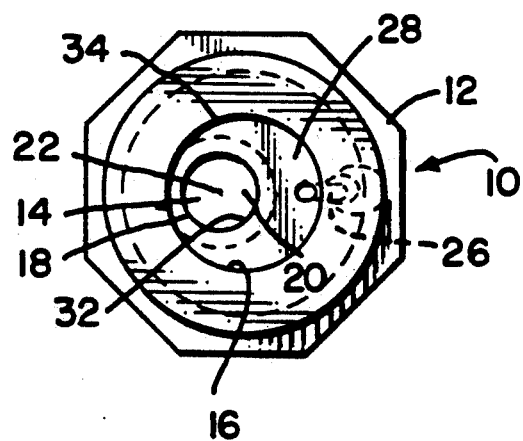

Further objects of this invention, as well as the novel features thereof, will become apparent by reference to the following description, taken in conjunction with the accompanying figures, in which:

FIG. 1 is an axial, cross-sectional view of the novel spark plug adapter, according to an embodiment thereof; and FIG. 2 is an end view of the adapter, taken along 2—2 of FIG. 1.

As shown in the Figures, the novel spark plug adapter 10, comprises a body 12 having a throughgoing bore 14 formed therein. A first portion 16 of said bore is unthreaded, and the remaining portion 18 thereof is threaded. The body 12 has a central, longitudinal axis 20, and threaded bore portion 18 has a central, longitudinal axis 22 which is parallel to, and offset from the body axis 20.

The bored body 12 has a circumferential wall 24. A channel 26 is formed in the wall 24, the same extending from an outer end 27 of the body 12 to a location within the bore 14 which is intermediate the length of the body.

Bore portion 16 is of greater diameter than bore portion 18 and this, in addition to the offset of portion 18, defines a land 28 at the juncture of the two bore portions. The channel 26 opens onto the land 28.

The outer surface 30 of the body 12 which circumscribes the bore portion 16 has threading formed therein; it is this end of the adapter 10 which is received in an engine cylinder head (not shown). The bore portion 18 threadedly receives a spark plug (not shown).

In use, in place in an engine cylinder head, the adapter 10 accommodates an admittance of fuel through the channel 26. The admitted fuel enters via the land 28 into the bore portion 16; the latter serves as a fuel-enriched chamber. The land 28 is defined by a concave edge 32 and an outer, convex perimeter 34. The land spaces the inner end of the channel slightly from the spark plug, and yet sufficiently proximate thereto to insure ignition in the chamber/bore portion 16 and, as a consequence thereof, will cause concomitant ignition of a lean air/fuel mixture within the engine cylinder.

While I have described my invention in connection with a specific embodiment thereof it is to be clearly understood that this is done only by way of example, and not as a limitation to the scope of the invention as set forth in the objects thereof and in the appended claims.

I claim:

1. A spark plug adapter, comprising:
    a body having a throughgoing bore formed therein; wherein
    a first portion of said bore is unthreaded, and a remaining portion of said bore is threaded; and
    said body has a central, longitudinal axis; wherein
    one of said bore portions has a central, longitudinal axis which is parallel to, and offset from said axis of said body;
    means formed in said body, independent of said bore, for accommodating fluid flow therethrough from an axial end of said body to one of said bore portions;
    said portions of said bore meet at a juncture within said body;
    said body has a land formed therein at said juncture; and
    said means opens onto said land.

2. A spark plug adapter, according to claim 1, wherein:
    an outer surface of said body which circumscribes said first portion of said bore has threading formed therein.

3. A spark plug adapter, according to claim 1, wherein:
    said means comprises a channel, formed in said body alongside of said remaining portion of said bore, which opens into said first portion of said bore.

4. A spark plug adapter, according to claim 1, wherein:
    said land is defined by an inner, concave edge, and an outer, convex perimeter.

* * * * *